May 17, 1966  T. RUSZ  3,251,361
METHOD OF AND APPARATUS FOR CONTROLLING THE PROPORTION
OF A VAPOR IN A GAS STREAM
Filed April 2, 1963  2 Sheets-Sheet 1

TIBOR RUSZ
INVENTOR.

BY Karl J. Ross
AGENT

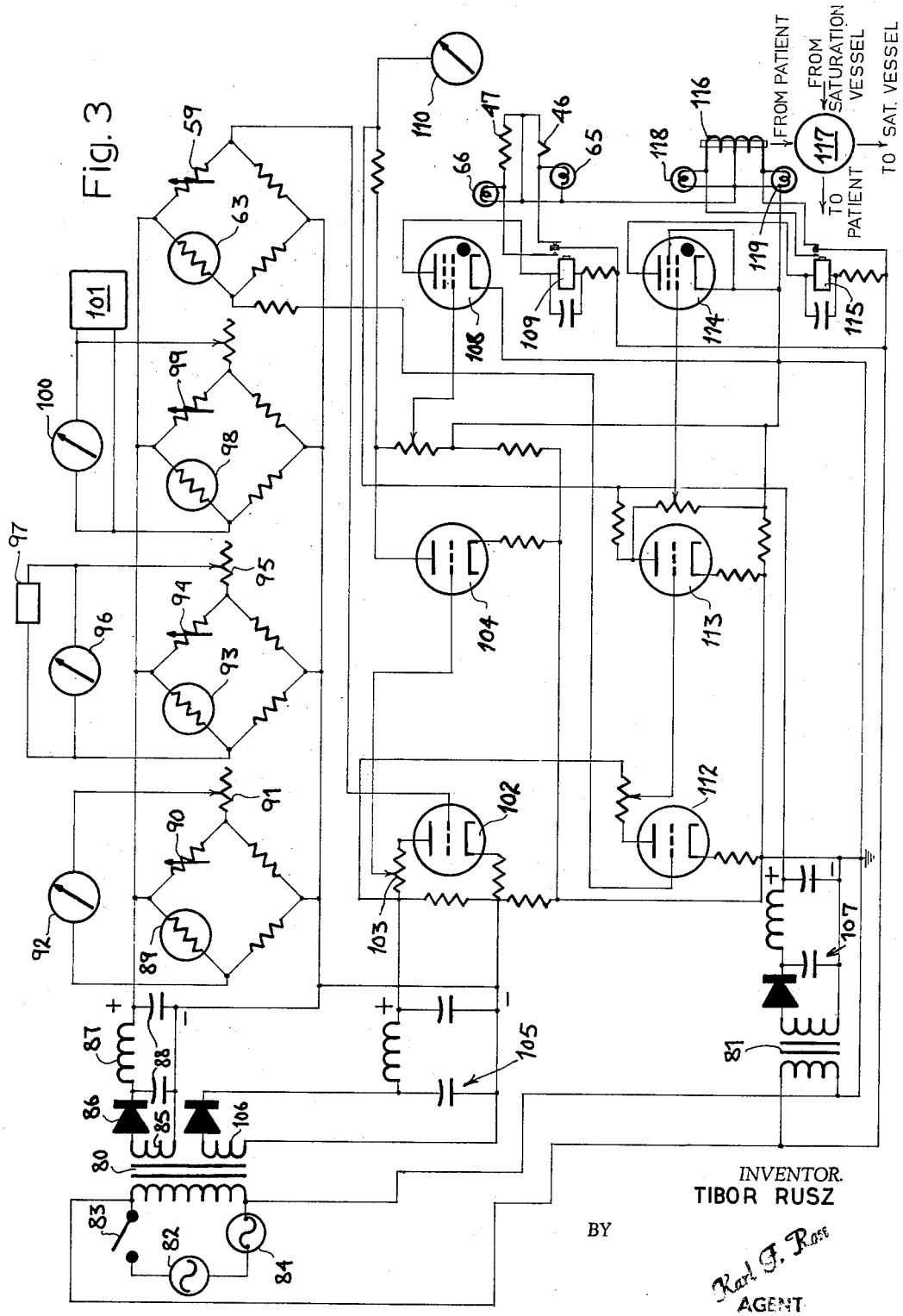

United States Patent Office 3,251,361
Patented May 17, 1966

3,251,361
METHOD OF AND APPARATUS FOR CONTROLLING THE PROPORTION OF A VAPOR IN A GAS STREAM
Tibor Rusz, Pittsfield, Mass., assignor of one-third each to Louis M. Friedman, New York, and Steven Szekely, Brooklyn, N.Y.
Filed Apr. 2, 1963, Ser. No. 270,083
10 Claims. (Cl. 128—188)

The present invention relates to a method of and an apparatus for establishing the amount of vapor in a gas stream at a predetermined proportion and, particularly, to a system whereby the proportion of vapor in a gas stream can be precisely regulated for anaesthetic purposes.

In general, the proportion of a vapor in a gas stream has hitherto been established by monitoring the gas stream (e.g., by spectrographic analysis) and compensating for deficiencies or surplus of the vapor constituent by either increasing or decreasing the rate of addition of the vapor to the stream. This method has various disadvantages including the need for expensive analysis and control equipment, the attendance of a skilled operator and precise flow-control components with their inherent propensity toward difficulties. The problem is multiplied when attempts are made to operate in a closed system with, say, the vapor constituent being withdrawn in variable amounts. Operation in a closed system is particularly desirable in the case of certain recently developed anaesthetics (e.g., halothane) which are expensive and must be conserved. These added difficulties arise in part from the fact that the quantity of anaestheic withdrawn from the gas stream by the patient fluctuates rapidly, so that an exceedingly rapid response is necessary for the prior control systems to stabilize the proportion of anaestheic in the gas stream.

It is an object of the present invention to provide an improved method of and system for controlling the amount of a vapor in a gas stream wherein monitoring of the stream with its inherent disadvantages can be avoided.

It is another object of this invention to provide a closed system for supplying anaesthetic to a patient in a gas stream with maximum efficiency and minimum loss of the anaestheic.

These objects are attained in accordance with the present invention by a method which is based upon the physical principle that, at substantially any temperature, a gas can be saturated only with a predetermined proportion of vapor, so that a definitive relationship between saturation temperature and percentage of vapor in the gas can be established. The present method which involves the control of the amount of vapor in a gas stream at a predetermined proportion when the gas stream is at an operable temperature above that at which this proportion of vapor can saturate the stream and comprises the step of cooling the stream to a temperature at which it is saturable with the vapor in precisely this predetermined proportion; the cooled gas stream is then exposed to the vapor to permit saturation thereby, whereupon its temperature is raised to the aforementioned operating temperature. It is clear that the proportion established at the saturation point will be maintained in the effluent gas stream, since the temperature rise cannot result in any precipitation of the vapor. It is, however, desirable to insure that the temperature of the gas stream is only increased after the latter has passed from the saturation vessel, so that a further rise in the vapor content in the stream, as a consequence of volatilization of the liquid substance, it not possible.

Advantageously, the saturation of the gas stream takes place at a temperature at which the vapor is in a liquid state (i.e., below the boiling point of the substance) with the cool gas being passed into intimate contact with the liquid. It will be immediately apparent that the present system permits recirculation of the gas stream in spite of the fact that part of the vapor has been removed. The saturation level is independent of the preexisting proportion of vapor in the stream so that, considering an extreme case, even an excessive proportion of vapor will, upon cooling of the gas stream, be eliminated and the vapor content restored to the normal ratio as a consequence of precipitation of the excess.

The closed anaesthesizing system can be provided with means for removing contaminants from the gas stream prior to its resaturation with the vapor. The contaminants include water vapor and carbon dioxide exhaled by the patient and which can be trapped by conventional means. Since the patient additionally depletes oxygen from the stream, means must be provided for replenishing this oxygen. It has been found that most anaesthetic substances, which are volatile at the operable temperature, or even room temperature, and are administered in a carrier gas stream, can be used with ease in the present invention; thus, in addition to halothane, chloroform, fluoroxane, pentane, trifluoroethyl vinyl ether, methoxylurane, ethylvinyl ether and trichloroethylene are examples of anaesthetics which can be used. This method permits proportions of less than or on the order of 1% to be stabilized with ease and thus represents a marked improvement over earlier systems wherein such low proportions encountered further flow-control difficulties.

According to another aspect of the present invention, the system or apparatus for controlling the vapor proportion, in addition to including cooling means, saturating means and heating means functioning in the aforedescribed manner, comprises conduit means for conveying the vapor-containing gas stream to the patient and conducting depleted gas therefrom in a closed path. This path preferably includes heat exchanger means whereby the vapor-containing gas can be heated to the operable temperature (generally about room temperature and, say, 37° C. or body temperature in the case of an anaesthetic) at least partly by the sensible heat of the depleted gas. Moreover, the closed path includes absorption means for removing exhaled carbon dioxide and water.

The above and other objects, features and advantages of the present invention will become more readily apparent from the following description, reference being made to the accompanying drawing in which:

FIG. 3 is a circuit diagram of a more sophisticated control system.

Figure 1:
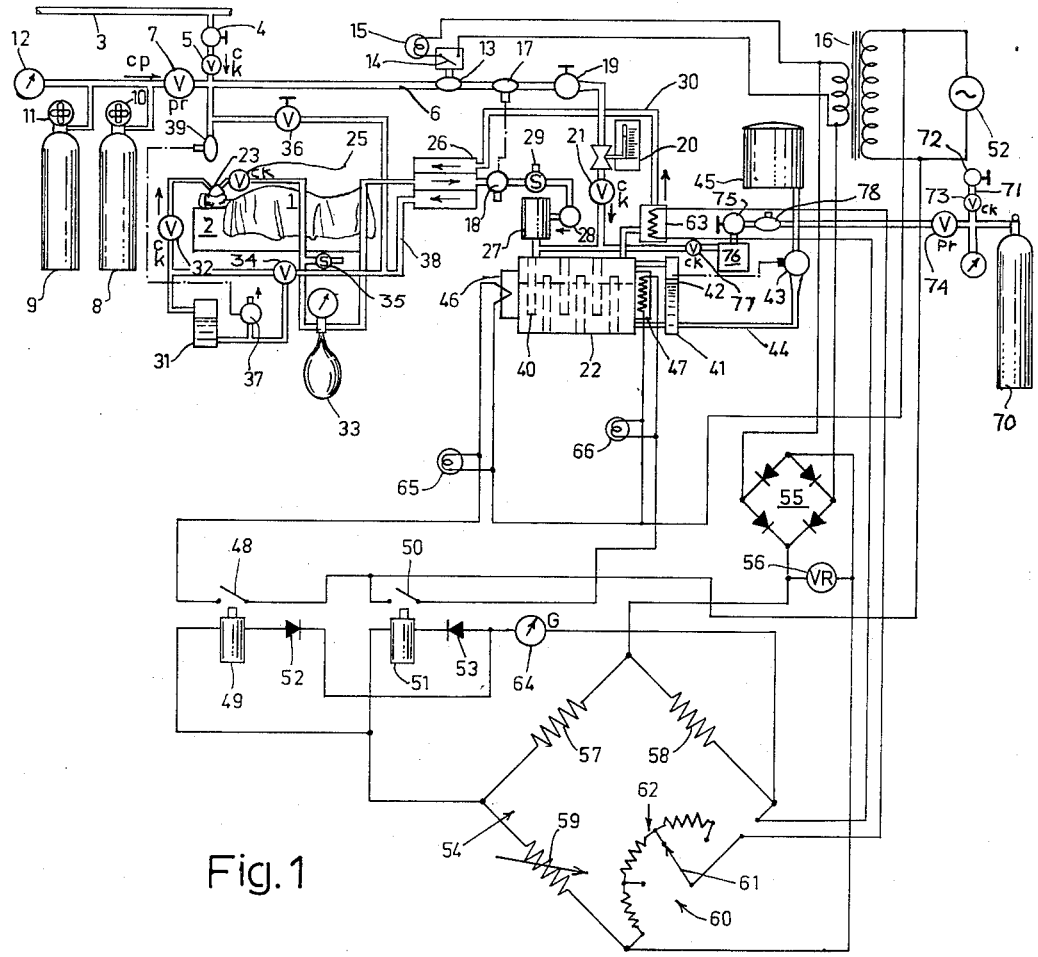
FIG. 1 is a flow diagram illustrating a system for stabilizing the proportion of a vapor in a gas stream, according to the invention, and showing the control means therefor.

FIG. 1 shows a system for supplying anaesthetic to a patient 1 on an operating table 2. The system includes the oxygen-supply line 3 of the hospital which is connected via a control valve 4 and a check valve 5 to a feeder 6. The latter is supplied via a constant-pressure reducing valve 7 from an oxygen source consisting of the tank 8 and 9. These tanks may be selectively connected with the feeder 6 by respective valves 10 and 11, while a pressure gauge 12 indicates the respective tank pressure. In feed line 6, there is provided a pressure-responsive switch 13 whose contacts 14 are connected in circuit with an indicating lamp 15 and the secondary winding of a supply transformer 16. A failure in the oxygen-supply system 6 etc. will result in a reduction of pressure within the line and a closure of contacts 14 to light lamp 15 and indicate to the attendant the failure thus sensed. A pressure-sensitive device 17 is also interposed in the line 6 and controls a venting valve 18 to open the closed anaesthetic system to the atmosphere and thereby prevent suffocation of the patient in the event of a failure of the oxygen-supply system. A needle valve 19 in the feeder line 6 serves to meter the amount of oxygen added to the circulating gas stream with the oxygen flow rate being indicated by flow meter 20 which can be of the Venturi type. A check valve 21 prevents back flow into the feeder line upon sudden reduction in the oxygen-supply pressure. The oxygen is added to the gas stream as it enters the saturation vessel 22 which will be described in greater detail hereinafter.

The flow-control device can include separate indicators for the fine and coarse oxygen-feed adjustments.

The patient exhales into the administering means, i.e., a face mask 23, with the depleted gas stream being led therefrom via a check valve 25 preventing backflow of the depleted gases. The exhaled gas is conducted past the usual pop-off safety valve 35 and breathing bag 33 and, possibly, through a water and carbon dioxide absorber not shown. These gases are in a warm state (i.e., substantially at body temperature) and pass through a heat exchanger 26 in countercurrent to the vapor-containing gas stream which is heated thereby. After flowing past the venting valve 18, the depleted gas enters a canister 27 containing a suitable carbon dioxide absorbent (e.g., calcium oxide). A check valve 28 at the inlet to the canister prevents release of the gas therein when the venting valve 18 is opened. A safety valve 29 is also provided at the inlet side of the absorption canister 27 for relieving the pressure in the line upon an increase of the pressure therein above a predetermined level. The canister empties into the saturating or condensation vessel 22. A vaporizer for ensuring saturation of the recirculated gas stream with the vapor can be interposed between the absorber 27 and the vessel 22 and should have a saturation level well above that of the vessel 22.

The vapor-saturated gas stream leaving vessel 22 via line 30 enters the heat exchanger 26 where it absorbs sensible heat from the depleted gas and passes through a humidifier 31 into the face mask 23. The gas, bubbled through the water-filled humidifier 31, is prevented from backflow in the event of a check valve 32. A bypass valve 34 is provided to shunt the humidifier 31 if desired. In addition, an oxygen-bypass valve 36 is provided to admit oxygen directly to the mask 23 in the event that anaesthesia is to be halted and the patient requires it. Another venting valve 37 is included in the intermission line 38 for the vapor-containing fluid leaving the heat exchanger 26 and is opened upon detection by pressure sensor 39 of a failure in the oxygen-supply system. Check valves 25 and 32 are merely representative of the usual check valves provided for the face mask to maintain unidirectional flow.

The saturation vessel 22 comprises an array of baffle plates 40 which form an undulating path for the gas stream which is intimately mixed with the liquefied anaesthetic within this vessel. A level-indicating tube 41 is provided for the vessel whereby the height of the anaesthetic liquid can be seen at a glance. A level-responsive element 42 (e.g., a float switch) can be coupled to the electromagnetically operated supply valve 43 of line 44 to maintain the anaesthetic at a predetermined level. Supply line 44 terminates at a reservoir 45 containing the anaesthetic. The vessel 22 is provided with refrigerating means 46 for lowering the temperature of the anaesthetic therein as required. The refrigerating means is preferably a thermoelectric device employing the Peltier effect, although conventional compressor and refrigerant systems can also be used. A heating element 47 is provided for elevating the temperature of the vessel should it fall below the value desired. The refrigerating means 46 is connected in circuit with the contacts 48 of a relay 49, while the heating means 47 is similarly energizable via the contacts 50 of a relay 51 from the alternating power source 52. The relays 49 and 51 are connected in series with respective oppositely poled rectifiers 52, 53 across one diagonal of a resistance bridge 54 which is energized by a low-voltage direct-current rectifier network 55 powered by the secondary winding of transformer 16. A conventional voltage-regulator tube 56 insures ripple-free supply of power to the bridge 54. The latter comprises a pair of fixed resistors 57, 58 and an adjustable resistor 59 in the form of a manually settable potentiometer. The fourth side of the bridge includes a selector switch 60 whose wiper 61 selectively connects a plurality of resistors 62 in circuit with this side of the bridge. The latter also includes a thermistor 63 in the outlet line 30 of the closed fluid path to detect the temperature in the outflowing gas stream. A galvanometer 64 is connected in series with the relays 49, 51 to indicate the degree of unbalance of the bridge.

Figure 2:
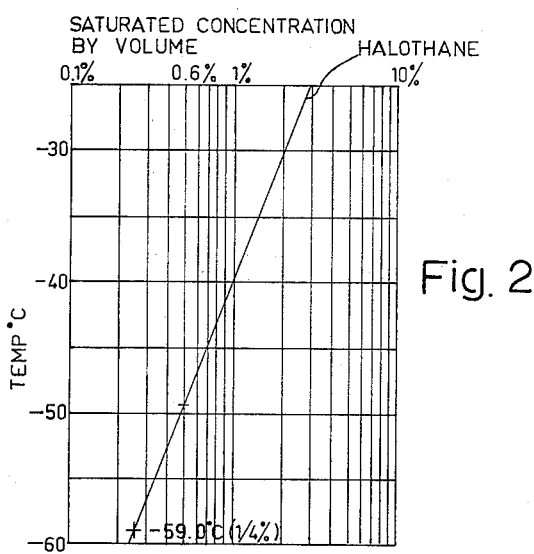
FIG. 2 is a graph of anaestheic saturation characteristics utilized in connection with the system of FIG. 1.

In operation the anaesthetist sets the switch 60 to a position connecting an appropriate resistance 62 into the bridge circuit depending upon the particular anaesthetic to be used. Resistors 62 thus serve to compensate for differences in the saturation characteristics of the various anaesthetics, so that potentiometer 59 can be set directly in proportion units without other adjustment. The setting of potentiometer 59 to, say, ¼% with switch 60 set at the proper contact for halothane (see FIG. 2), will unbalance the bridge in such manner as to energize relay 49 and close the circuit to the refrigerating means. Pilot lamps 65, 66 are connected in the circuits to the refrigeration means 46 and the temperature elevating means 47 to indicate to the attendant that one of these units is operating. The temperature within vessel 22 is thus reduced to approximately −59° C. (FIG. 2). The gas stream passing through the closed system 24, 30, 38 traverses the temperature-sensitive thermistor 63 upon leaving the vessel 22 so that when the temperature within the vessel attains the proper value, the bridge will be balanced and relay 49 opened. Any increase in the temperature of the vessel will again cause unbalancing in the sense previously described to effect additional cooling, while an undesired reduction in the temperature will be sensed by thermistor 63 and unbalance the bridge 54 in the opposite direction, so that relay 51 is energized to actuate the heating means 47. When the galvanometer 64 is centered, the vessel 22 is at the proper saturation temperature.

The gas stream leaving this vessel is saturated with halothane in a proportion of ¼% and passes through the heat exchanger 26 whil its temperature is raised to substantially body temperature (i.e., about 37° C.) by absorption of heat from depleted gas. After humidification in container 31 the gas stream is supplied to the patient via mask 23. The exhaled gas flows through the heat exchanger and into the absorption canister 27 whereby undesirable contaminants such as carbon dioxide and water are removed by conventional dessicators and $CO_2$ adsorbents. Oxygen, the flow of which is regulated by valve 19 and flow meter 20, is admixed with the gas stream as it passes into the vessel 22 for recirculation. As can be seen from FIG. 2, stabilization of the halothane concentration at, say, 0.5% will require a saturation temperature of about −49.5° C. while stabilization at 1% can be carried out at a saturation temperature of −40° C. These values are only provided by way of example, it being noted that similar curves can be provided indicating the temperature at which desirable proportion of other volatile anaethetics can be employed.

The system can also include a tank 70 for supplying an additive gas such as nitrous oxide to the recirculated gas stream. This additive gas can also be supplied from the hospital line 71 via a control valve 72 and a check valve 73. The gas passes through a constant-pressure reducing valve 74 to a throttle valve 75 from whence it is led through a flow meter 76 and a check valve 77 to join the oxygen stream supplied via line 6. A pressure-sensing element 78 serves to detect a failure in the nitrous oxide line and activates an alarm similar to that provided in the oxygen supply arrangement. It should be noted that the flow meters used to control gas feed can be provided with thermistors or similar sensing elements and incorporated in the basic control system for fine regulation.

In FIG. 3 I show a circuit suitable for controlling the system of FIG. 1 and adapted to be substituted for the simplified controls illustrated therein. The control circuit can include a pair of isolating power transformers 80, 81 which are supplied from an alternating current source 82 via the usual power switch 83 and fuse 84. The filament circuit is not shown for simplicity of illustration. Power transformer 80 supplies a secondary winding 85 whose rectifier 86, choke 87 and vertical capacitor 88 constitute a direct-current supply for a plurality of bridge networks. The first of these networks comprises a thermistor 89 incorporated within a coarse oxygen flow meter whose setting potentiometer 90 constitutes part of this bridge network. The output diagonals of the bridge are connected via a variable adjusting resistor 91 to a galvanometer 92 which is calibrated directly in gross oxygen flow. A second bridge includes thermistor 93, constituting part of a fine oxygen flow meter in parallel with the coarse flowmeter. A fine adjustor 94 is also provided and the bridge output includes a variable resistor 95 and an inducting meter 96. An alarm 97 adapted to attract attention to a failure in the oxygen supply system is also provided. Another bridge, also supplied by the rectifier circuit 86–88, is provided for controlling the nitrous oxide content of the gas stream. Again a sensing element 98 is coupled with a setting element 99 in a bridge circuit whose output is shown by a meter 100 and can activate an alarm 101 upon failure of the nitrous oxide supply.

Still another bridge serves, in a manner similar to that previously described, to control the temperature of the saturating vessel. To this end, the thermistor 63 is provided in a bridge network with the setting resistor 59, with the output of the bridge fed to the grid of an amplifier tube 102 whose output is tapped by a plate resistor 103 and supplied to the grid of a second stage amplifier 104. The first-stage amplifiers are in circuit with a rectifier circuit 105 of the other winding 106 of transformer 80, while the second stage amplifiers are supplied with a higher voltage by rectifier circuit 107 of transformer 81. The amplified signal of triode 104 is led to a thyratron 108 which, when fired, operates a relay 109 to energize the heating element 47 of the saturating vessel. In the "off" state of the thyratron, the contacts of the relay in the rest position energize the thermoelectric cooling element 46 of the saturation vessel. A meter 110 indicating the balance of the temperature control bridge is connected across a resistor 111 in the plate circuit of amplifier 104.

In the event that the temperature in the saturation vessel, for some reason, is so great that a dangerous proportion of the anaesthetic vapor will be added to the stream supplied to the patient, it is desirable to provide means for bypassing the saturation vessel. For this purpose, an output of the temperature control bridge is fed to the grid of the first stage amplifier 112 from which the amplified signal passes to a second-stage triode 113. The output of this tube is then communicated to a thyratron 114 whose relay 115 can operate the solenoid 116 of a bypass valve 117. Indicator lamps 118 and 119 show the duration of energization of the solenoid 116. Upon an abnormal rise in the temperature of the gas stream emanating from the saturation vessel, thyratron 114 is rendered conductive to actuate relay 115 so that indicator lamp 118, showing an unusual condition, is illuminated. Solenoid 116 then operates to divert the gas stream from the patient to the mask without passing through the saturation vessel. Normally, however, the rest position of the relay 115 is such that the valve 117 permits flow of gas from the patient to the saturation vessel and from the saturation vessel to the patient.

The invention described and illustrated is believed to admit of many modifications within the ability of persons skilled in the art, all of which are considered as falling within the spirit and scope of the invention as claimed.

I claim:

1. In a method of orally administering an anaesthetic in the vapor state to a patient in an oxygen-containing gas stream, the improvement which comprises controlling the amount of the anaesthetic vapor in the oxygen-containing gas stream to be supplied to the patient in a predetermined proportion and at an operable temperature above that at which said vapor saturates said stream by the steps of cooling said gas stream to a temperature at which said gas stream is saturable with said anaesthetic; exposing the cooled gas stream to said anaesthetic to permit saturation of said gas stream thereby; and thereafter raising the temperature of the gas stream previously saturated with said anaesthetic to said operable temperature in the absence of liquid anaesthetic.

2. In a method of orally administering an anaesthetic in the vapor state to a patient in an oxygen-containing gas stream, the improvement which comprises controlling the amount of the anaesthetic vapor in the oxygen-containing gas stream to be supplied to the patient in a predetermined proportion and at an operable temperature above that at which said vapor saturates said stream by the steps of: cooling said gas stream to a temperature at which said gas stream is saturable with said anaesthetic; exposing the cooled gas stream to said anaesthetic to permit saturation of said gas stream thereby; and thereafter raising the temperature of the gas stream previously saturated with said anaesthetic to said operable temperature in the absence of liquid anaesthetic, said anaesthetic is selected from the group which consists of ethyl ether, chloroform, fluoroxane, pentane, methoxylurane, halothane, trichloroethylene, trifluoroethyl vinyl ether and ethylvinyl ether.

3. In a method of orally administering an anaesthetic in the vapor state to a patient in an oxygen-containing gas stream, the improvement which comprises stabilizing the amount of the anaesthetic vapor in the oxygen-containing gas stream to be supplied to a patient in a predetermined proportion and at an operable temperature in the region of body temperature and above that at which said vapor saturates said stream by the steps of passing said gas stream in a cyclical flow with at least a portion of the vapor contained therein being extracted by said patient; cooling said gas stream to a temperature at which said gas stream is saturable with said vapor in said predetermined proportion; exposing the cooled gas stream to said anaesthetic to permit saturation of said gas stream thereby; and thereafter raising the temperature of the gas stream previously saturated with said anaesthetic to said operable temperature in the absence of liquid anaesthetic prior to supplying the gas stream to said patient.

4. The improvement defined in claim 3 wherein said gas stream is cooled to a temperature below the boiling point of said anaesthetic and is saturated therewith by passing said gas stream in intimate contact with the liquid anaesthetic.

5. The improvement defined in claim 3 wherein said patient depletes oxygen from said gas stream and introduces into the latter carbon dioxide, further comprising the steps of absorbing carbon dioxide from the gas stream and replenishing oxygen therein prior to the cooling of said stream.

6. The improvement defined in claim 3 wherein the temperature of the anaesthetic-containing gas stream is raised to said operable temperature by passing it in heat-exchanging relationship with the gas stream returning from the patient.

7. A system for supplying a volatile anaesthetic to a patient in an oxygen-containing gas stream and for maintaining the amount of anaesthetic supplied to said patient in said stream at a predetermined proportion, said gas stream being fed to said patient at an operable temperature above that at which said anaesthetic saturates said stream in said predetermined proportion, said system comprising administering means for supplying said gas stream to the patient; conduit means forming a substantially closed circulation path through said administering means for said gas stream with the latter being supplied to said patient and removed therefrom at said administering means along said path; cooling means forwardly of said administering means for reducing the temperature of said gas stream to one at which it is saturable with vapor of said anaesthetic in said predetermined proportion; saturating means along said path for exposing the cooled gas stream intimately to said vapor to permit saturation of said gas stream by said vapor; and heating means along said path for raising the temperature of the gas stream saturated with said vapor to said operable temperature prior to supplying said gas stream to said administering means whereby said gas stream contains less than a saturating quantity of said anaesthetic upon entering said administering means.

8. A system for supplying a volatile anaesthetic to a patient in an oxygen-containing gas stream and for maintaining the amount of anaesthetic supplied to said patient in said stream at a predetermined proportion, said gas stream being fed to said patient at an operable temperature above that at which said anaesthetic saturates said stream in said predetermined proportion, said system comprising administering means for supplying said gas stream to the patient; conduit means forming a substantially closed circulation path through said administering means for said gas stream with the latter being supplied to said patient and removed therefrom at said administering means; cooling means along said path forwardly of said administering means for reducing the temperature of said gas stream to one at which it is saturable with vapor of said anaesthetic in said predetermined proportion; saturating means along said path for exposing the cooled gas stream intimately to said vapor to permit saturation of said gas stream by said vapor; and heating means along said path for raising the temperature of the gas stream saturated with said vapor to said operable temperature prior to supplying said gas stream to said administering means whereby said gas stream contains less than a saturating quantity of said anaesthetic upon entering said administering means, said saturating means including a vessel containing said anaesthetic in a liquid state and guide means for passing said gas stream into intimate contact with said liquid, said cooling means including refrigeration means for maintaining said vessel at a relatively low temperature.

9. A system as defined in claim 8 wherein said path includes heat-exchanger means for transferring heat between the gas stream emanating from said patient and supplied thereto for raising the temperature of the gas stream saturated with said vapor.

10. A system as defined in claim 8 wherein said vessel is provided with temperature-elevating means, further comprising control means responsive to the temperature of the gas stream emanating from said vessel for selectively operating said refrigeration and temperature-elevating means.

References Cited by the Examiner
UNITED STATES PATENTS

| 2,131,103 | 9/1938 | Heidbrink | 128—191 |
| 2,704,925 | 3/1955 | Wood | 62—171 |
| 3,006,339 | 10/1961 | Smith | 128—191 |
| 3,075,523 | 1/1963 | Eichelman | 128—191 |

RICHARD A. GAUDET, *Primary Examiner.*

D. S. BURKS, W. E. KAMM, *Assistant Examiners.*